United States Patent
Gibson et al.

(10) Patent No.: US 7,389,762 B1
(45) Date of Patent: Jun. 24, 2008

(54) SYSTEM AND METHOD FOR CONTROLLING VALVE ACTUATORS

(75) Inventors: Alex O'Connor Gibson, Ann Arbor, MI (US); Ilya V. Kolmanovsky, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 11/739,978

(22) Filed: Apr. 25, 2007

(51) Int. Cl.
*F02D 13/06* (2006.01)
(52) U.S. Cl. ................................ 123/198 F; 123/198 D
(58) Field of Classification Search ............. 123/406.2, 123/90.22, 198 D, 198 F, 90.15–90.18
See application file for complete search history.

(56) References Cited

U.S. PATENT DOCUMENTS

| | | | |
|---|---|---|---|
| 5,549,080 A | 8/1996 | Uchikawa | |
| 6,101,442 A | 8/2000 | Lewandowski | |
| 6,278,932 B1 | 8/2001 | Baumel | |
| 2003/0213442 A1* | 11/2003 | Cornell et al. | 123/90.12 |
| 2005/0172920 A1* | 8/2005 | Machida | 123/90.15 |
| 2005/0174717 A1 | 8/2005 | Machida et al. | |
| 2005/0193980 A1* | 9/2005 | Doering | 123/406.47 |
| 2005/0205060 A1* | 9/2005 | Michelini et al. | 123/432 |
| 2005/0252484 A1* | 11/2005 | Vanderpoel et al. | 123/321 |

OTHER PUBLICATIONS

U.S. Appl. No. 11/352,615, filed Feb. 13, 2006, Grider.

* cited by examiner

*Primary Examiner*—Noah Kamen
(74) *Attorney, Agent, or Firm*—Donald J. Lewis

(57) ABSTRACT

A system for communicating information between a first controller and a second controller is presented. The system is designed to improve and increase the robustness data transferred between two controllers.

20 Claims, 5 Drawing Sheets

SYSTEM AND METHOD FOR CONTROLLING VALVE ACTUATORS

FIELD

The present description relates to a system for operating an engine that is controlled by an engine controller and a valve controller.

BACKGROUND

One system to control an engine during a condition of valve actuator failure is described in U.S. Pat. No. 6,278,932. The system description presents a way to control different cylinder banks of an engine that has individual valve actuator control units if data transmission between the actuator units and an engine control unit fail. Specifically, the individual actuator control units contain independent performance characteristics for operating valves, fuel injectors, and the ignition. For this operating mode, the communication link between actuator units must be functional. The actuator units also appear to rely on information provided by engine sensors in this operating mode. And, the system deactivates an entire cylinder bank if a single valve actuator fails.

The above-mentioned method can also have several disadvantages. Specifically, engine torque is likely to decrease when the operation of a single electrically actuated valve degrades. Since the method deactivates an entire cylinder bank, engine torque can be reduced by half. Further, although deactivating a bank of a six cylinder engine can produce an even firing engine, deactivating a bank of cylinders on an eight cylinder will produce an uneven firing engine. This can increase engine noise and vibration. In addition, the system also requires that data transmission between two actuator controllers be functional if the valve controllers are to continue operating during a communication failure between the engine controller and the valve controllers.

The inventors herein have recognized the above-mentioned disadvantages and have developed a method that improves operation of an engine if communication between a valve controller and an engine controller degrades.

SUMMARY

One example approach to overcome at least some of the disadvantages of prior approach includes a method for controlling valves of a variable valve event valvetrain, the method comprising: controlling at least a valve of a variable event valvetrain in at least a cylinder of an engine by using a valve controller; and using an engine controller to deactivate said at least a cylinder when a communications link between said valve controller and said engine controller is at least partially degraded.

Engine operation can be improved by using an engine controller to deactivate one or more cylinders of an engine when communications between the engine controller and a valve controller have at least partially degraded. For example, if communications between an engine controller and a valve controller have degraded, the engine controller can deactivate one or more cylinders where valve operation has degraded. Specifically, in one example, an engine controller can deactivate two cylinders of an eight cylinder engine by controlling the output to one or more electrically actuated devices that inhibit fuel flow and/or electrical current to a cylinder where valve operation had degraded concurrently with degradation in communications between the valve controller and the engine controller. This method allows an engine to combust air-fuel mixtures in an even firing sequence even when the operation of a single valve has degraded concurrently with communications degradation between an engine controller and a valve controller. In addition, since the engine controller has the capacity to deactivate individual cylinders, rather than an entire bank of cylinders, the method can mitigate the effects of valve degradation without reducing the engine torque capacity by half.

The present description provides several advantages. For example, the method can retain a higher engine torque capacity by selectively deactivating cylinders rather than deactivating an entire cylinder bank. Further, the method does not require that communications between separate valve controllers be maintained. Further still, the method enables an even firing cylinder order in a variety of engine configurations.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
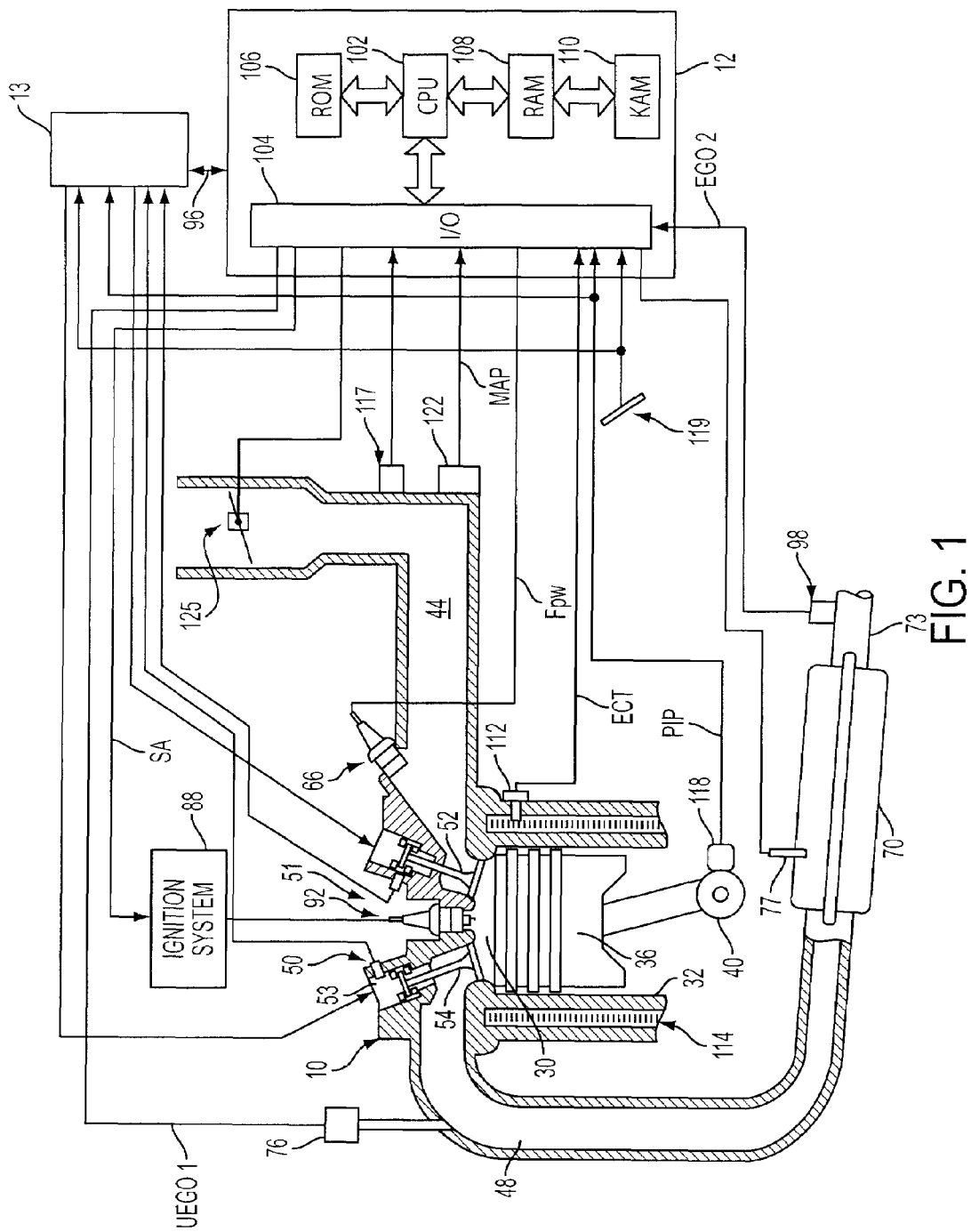
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54.

Each intake and exhaust valve is operated by an electromechanically controlled valve coil and armature assembly 53. The valves are actuated and controlled by VCU 13, which may have one or more internal processors that are used to control one or more valve actuators. Alternatively, valves may be controlled by valve control processors in an engine controller, whereby the valve control processors communicate with an engine control processor. Note that a particular engine control configuration may have one or more valve controllers that are similar to VCU 13. In another embodiment, the intake 52 or exhaust 54 valve may be mechanically actuated via a camshaft, for example. Further, a device may be used to control valve lift and/or valve timing of mechanically actuated valves. Valve actuator armature temperature is determined by temperature sensor 51. Valve position is determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust pipe 73 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Engine controller 12 is shown in FIG. 1 as a conventional microcomputer including: microprocessor unit 102, input/output ports 104, and read-only-memory 106, random-access-memory 108, 110 Keep-alive-memory, and a conventional data bus. Engine controller 12 is shown receiving various signals from sensors coupled to engine 10, in addition to those signals previously discussed, including: brake boost pressure (not shown); fuel vapor canister hydrocarbon concentration sensor (not shown); engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from sensor 118 sensing crankshaft 40 position. Sensor 118 may be a variable reluctance, Hall effect, optical, or magneto-resistive sensor. Alternatively, a camshaft position sensor may also be provided and may be used to determine engine position. In a preferred aspect of the present description, engine position sensor 118 produces a predetermined number of equally spaced pulses every revolution of the crankshaft from which engine speed (RPM) can be determined.

Valve control unit (VCU) 13 communicates with controller 12 by way of one or more communication channels. Communication channel 96 is shown linking the VCU to the controller. In this example, communication channel 96 is a CAN bus that is capable of carrying data from engine controller 12 to the VCU or from the VCU to engine controller 12, although different communication interfaces may be used if desired. Also, note that for an engine having a plurality of cylinders, a plurality of valve controllers may be used and the communication system is not limited to a configuration comprised of a single valve controller and a single engine controller. Further, a valve controller can be configured to control only intake valves or only exhaust valves, if desired. By linking the engine controller to the valve controller, specific valve operating commands (e.g., the engine position at which valve openings and closings take place) can be sent from engine controller 12 to valve controller 13. The valve commands can be based on, for example, the operator torque request, engine temperature, barometric pressure, fuel type, and signals alike. The valve controller can also send status information over communication link 96 to engine controller 12. For example, the valve controller can be configured to send information if the performance of a valve has degraded. Also note that an engine control system may have one or more communications channels similar to link 96 that are capable of transferring data between one or more engine controllers to one or more valve controllers.

In one example, the valve controller can be programmed to control current supplied to valves such that the valves open and close at engine positions that are supplied by engine controller 12. To achieve these desired valve timings, a valve controller can look up empirically determined control parameters and adjust the valve current in relation to the control parameters. In another example, the valve control parameters can be updated based on past control commands and valve response so that any system variation has less affect on the actual valve opening and closing positions.

On the other hand, if communications are degraded between valve controller 13 and engine controller 12, the valve controller can be operated based on engine operating conditions. In one example, valves can be operated in response to operator torque demand and engine position. That is, valve controller 13 operates valves in response to pedal position sensor 119 and engine position sensor 118. A series of tables and/or functions within valve controller 13 are configured to provide empirically determined valve timing that substantially deliver (e.g., +20 N-M) the desired engine torque. Thus, valve controller 13 can be operated in response to engine operating data, without explicit instructions from engine controller 12. This allows valve controller 13 to act without direct input from engine controller 12 in an instance where communications between valve controller 13 and engine controller 12 has degraded.

Figure 2:
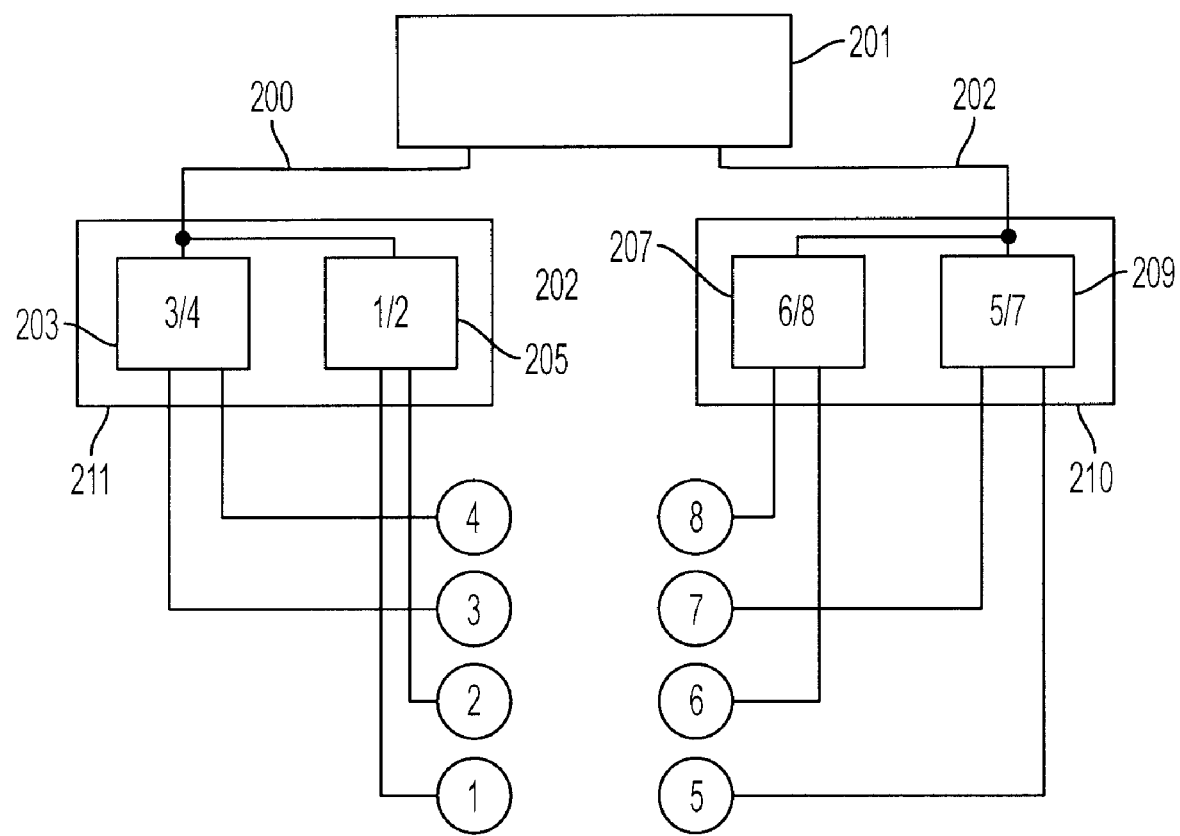
FIG. 2 is a schematic diagram of an example engine controller and valve controller configuration.

Referring now to FIG. 2, an example schematic of a valve control system is shown. This figure shows two valve control units, 210 and 211, similar to valve controller 13 described in FIG. 1, that are configured to communicate with engine controller 201, similar to engine controller 12 described in FIG. 1, and to operate and/or monitor valves for eight cylinders. The connections between each valve controller and the valves at each cylinder are shown as a single connection to simplify the figure. Also, connections between the valve controllers and sensors indicating engine operating conditions are not shown in an effort to simplify the figure.

Valve controller 211 is shown with processors 203 and 205. Processor 203 is shown labeled with the cylinders that it controls. Namely, processor 203 controls cylinder three and four. The other processors are labeled in a similar manner (e.g., processor 209 controls cylinders five and seven). Each processor is shown in communication with engine controller 201 and one or more valves located at the cylinders. Processors 203 and 205 communicate to engine controller 201 via communications link 200, while processors 207 and 209 communicate to engine controller 201 via communications link 202, similar to communications link 96 described in FIG. 1. In an alternative example, a single communications channel may be used to communicate between each of the respective processors and engine controller 201. That is, each valve controller communicates over the same communications channel and this communications channel carries data from each valve controller to the engine controller. Thus, a single communications link can be configured to route data between engine controller 201 and all valve controllers, if desired. In yet another example, each valve controller processor may have a separate link between each processor and engine controller 201, such that multiple communications links are between the valve controllers and engine controller 201. In yet another example, a dedicated link may be provided for communications between processors while another communications link provides a data path between the respective processors and engine controller 201. This configuration allows data to be exchanged through valve controllers without having to pass through the communications link where engine controller 201 is issuing valve timing commands. Therefore, the timing burden of exchanging data between the engine controller and the valve processors can be reduced.

Figure 3:
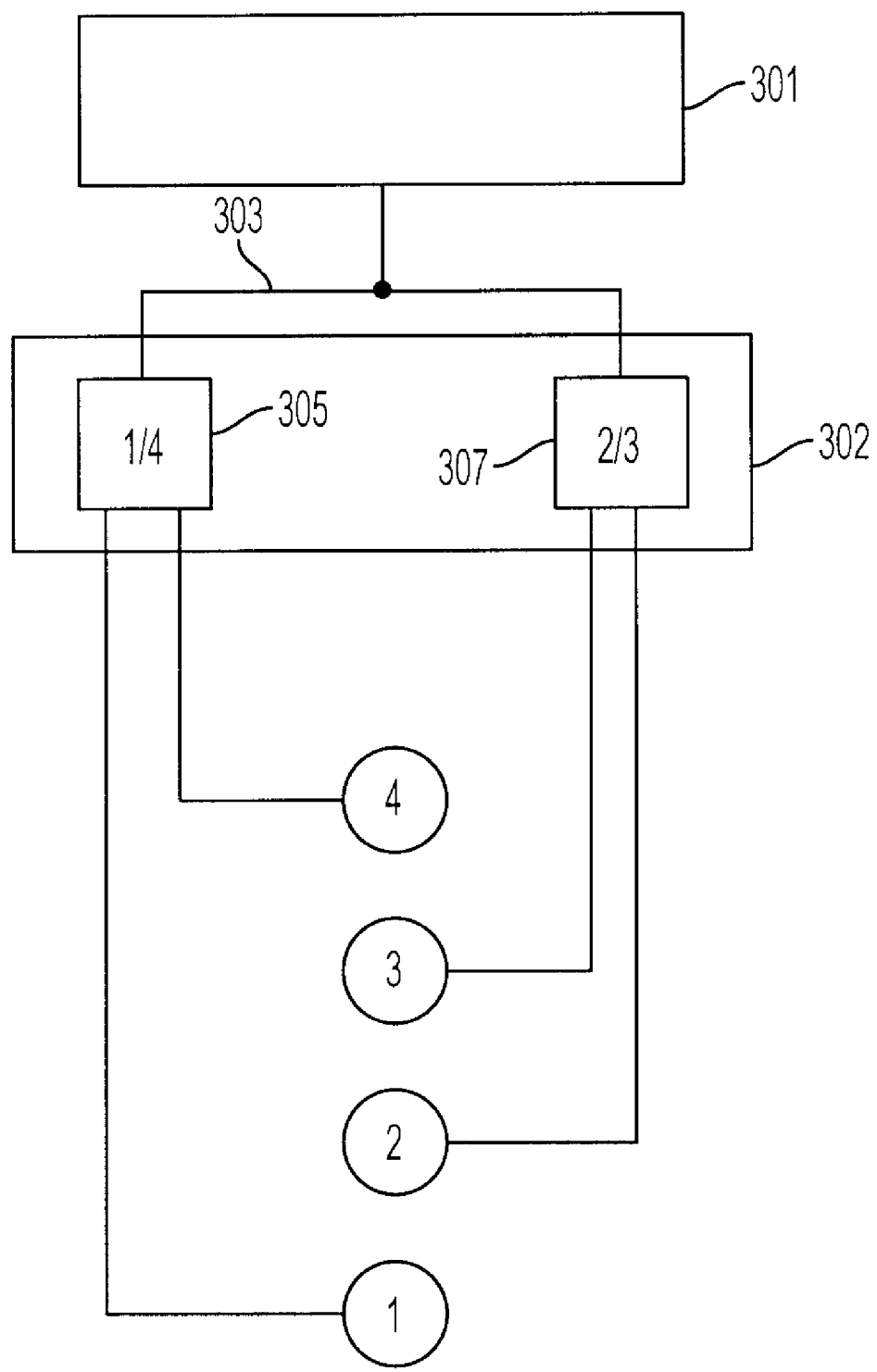
FIG. 3 is a schematic of an alternate engine controller and valve controller schematic diagram.
Figure 4:
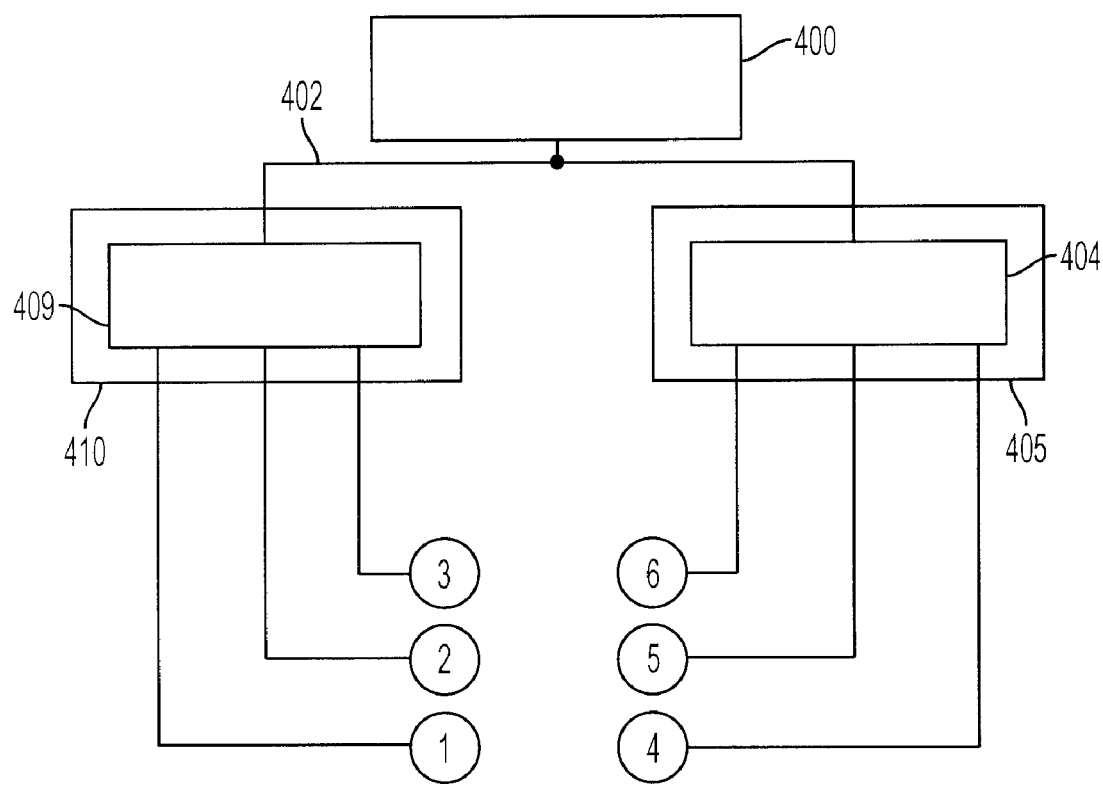
FIG. 4 is a schematic of another alternative engine controller and valve controller configuration.

Note that the various communications channels explained in the description of FIG. 2 may likewise be applied to the four cylinder engine of FIG. 3 and the six cylinder engine of FIG. 4 without departing from the scope or intent of this description.

Referring now to FIG. 3, an alternate valve control system configuration for a four cylinder valve control system is shown. Engine controller 301, similar to engine controller 12 described in FIG. 1, is in communication with VCU 302, similar to valve controller 13 described in FIG. 1, via bi-directional communication channel 302, similar to communication link 96 described in FIG. 1. VCU 302 is comprised of two processors, each processor in communication with two cylinders. For example, processor 305 controls valves operating in cylinders one and four. That is, the processor issues commands that vary current flow to individual variably actuated valves. Processor 307 is in communication with valves operating in cylinders two and three.

Referring now to FIG. 4, an alternate valve control system configuration for a six cylinder valve control system is shown. This figure shows intake valve timing for a four cylinder engine. In this example, a single CAN communication link 402, similar to the communications link 96 described in FIG. 1, carries data between engine controller 400, similar to engine controller 12 described in FIG. 1, and valve controllers 405 and 410, similar to valve controller 13 described in FIG. 1. Data may be exchanged over communications link 402 bi-directionally. Valve controller 410 controls one or more valves in cylinders one through three. Valve controller 405 controls one or more valves in cylinders four through six. The valve controllers also have processors 409 and 404 that determine control commands for the valves. These processors also communicate to engine controller 400 via communications link 402.

Figure 5:
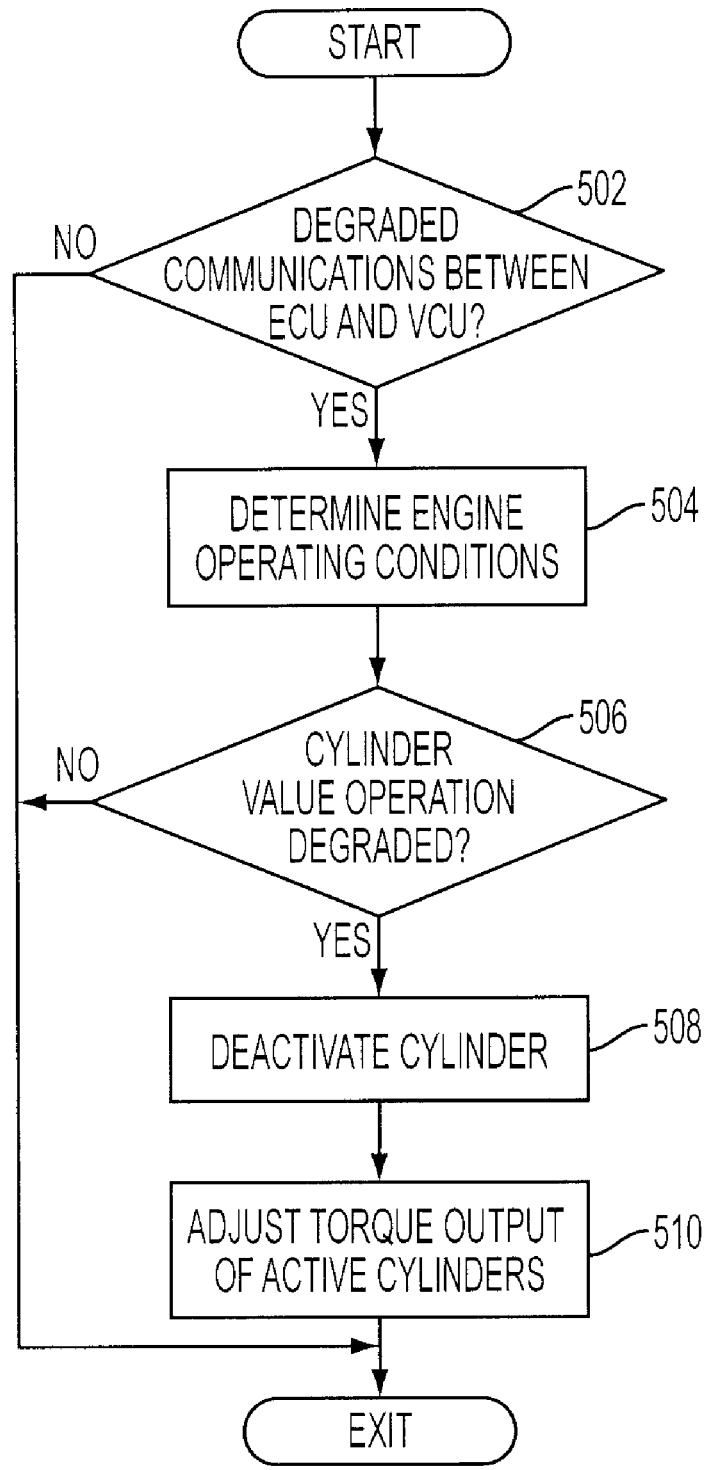
FIG. 5 is an example flow chart for controlling an engine having one or more valve controllers.

Referring now to FIG. 5, a flow chart of an example valve control strategy is shown. In step 502 the routine determines if there has been communications degradation between an engine controller and a valve control unit. Communications degradation may be determined in a variety of ways. For example, one way to determine communications degradation is to send a command and wait for a response. If the response varies from a desired response, there may be communications degradation. If there is no degradation the routine proceeds to exit. If there is communications degradation the routine proceeds to step 504.

Where there is no communications degradation or slight degradation, valve opening and closing commands can be sent from the engine controller to the valve controller. And if the operation of a valve degrades, the valve controller can send data over the communication link that interfaces the valve controller to the engine controller. The exchange of this data, along with other data (e.g., valve temperature information) allows the valve controller to apprise the engine controller of valve operating conditions and vise-versa. The engine controller can then make adjustments to valve timings or other engine components to compensate for valve degradation. For example, where there is some indication of valve degradation, an engine controller can adjust engine torque output to vary the valve controller power or current use, if desired.

On the other hand, if there is communication degradation between the engine controller and a valve controller or a valve processor, the engine controller and valve controller and/or processor may continue to operate, but the operation of the system may be limited in some way. For example, if there is communications degradation between a valve controller and the engine controller, the valve controller may operate in response to engine operating conditions without receiving valve timing adjustments from the engine controller.

In step 504, the routine determines engine operating conditions. Engine operating conditions can be determined and/or monitored by sampling various vehicle and/or engine sensors. For example, engine temperature can be determined by sampling the output of the engine coolant temperature sensor 112 that is shown in FIG. 1. In addition, engine operating conditions can include, but are not limited to the pressure in the engine intake manifold, the temperature in the engine intake manifold, the pressure in the engine exhaust manifold, the temperature in the engine exhaust manifold, the state of an engine exhaust gas oxygen sensor, the engine torque request, and barometric pressure. After engine operating conditions are determined, the routine proceeds to step 506.

In step 506, the routine determines if operation of one or more randomly operated valves has degraded. Previously, in step 502, the routine has determined that degradation in communications between a valve controller and engine controller exists. As such, the transfer of data from the valve controller to the engine controller may be reduced or impracticable. So rather than relying on data sent over the communications link from the valve controller to the engine controller, the engine controller can compare actual engine operating conditions to expected engine operating conditions and then determine if valve degradation has occurred. This is the case even when communications between a valve controller and an engine controller have degraded.

The degradation of a valve can be determined by the engine controller in several ways. For example, the engine controller can observe the temperature and pressure in the intake manifold to determine if degradation of an intake valve has occurred. In one example, the engine controller can compare an expected temperature and/or pressure with the pressure and/or temperature observed by monitoring sensors that indicate these conditions. When the actual temperature and/or pressure exceed the expected value, the engine controller determines that valve degradation has occurred.

In another example, the engine controller can observe engine speed and look at the rate of change in engine speed at specific crankshaft angles. In one example, the engine controller observes the engine speed rate of change between the crankshaft angles of top-dead-center (TDC) compression stroke and 120° after TDC compression stroke of a particular cylinder. In other words, the engine controller can observe the rate of change in engine speed for cylinder number one at the engine crankshaft angles between TDC compression stroke for cylinder number one and 120° after TDC compression stroke of cylinder number one. If the observed rate of change in engine speed is below a predetermined value, then the engine controller determines valve degradation. Valve degradation in the remaining cylinders can be determined similarly.

In yet another example, the engine controller can observe the amount of oxygen in the exhaust stream to determine if operation of a valve has degraded. In particular, the engine controller can determine that valve degradation may have occurred when the oxygen concentration in the exhaust gas is less than or greater than a specified value. In one embodiment, the exhaust gas oxygen concentration information can be used in conjunction with knowing the engine crankshaft angle to determine valve degradation in a particular cylinder. For example, where cylinder number one expels the contents of cylinder number one 200° after TDC compression stroke of cylinder number one, engine controller can sample the oxygen concentration of exhaust gases shortly afterward and determine if valve degradation in cylinder number one has occurred. A deviation in the expected cylinder air-fuel ration in this crankshaft angle region can be used to determine valve degradation for cylinder number one. Valve degradation in other engine cylinders can be determined in a similar way.

In still another example, an engine controller can determine valve degradation by observing the amount of air pumped through the engine. By monitoring a mass air flow sensor or a manifold pressure transducer and engine speed, the engine controller can determine if an unexpected change in engine air flow has occurred. Specifically, for a given throttle angle, the amount of air flowing through and engine can be subtracted from the expected amount of air flowing through the engine. If the subtraction yields a value that is less than or greater than expected, valve degradation can be determined. If the routine determines that valve degradation has occurred, the routine proceeds to step 508. Otherwise the routine exits.

Note that when a communications link between a valve controller and an engine controller has not degraded, valve degradation data and/or information can be sent from the valve controller to the engine controller. Having received this information, the engine controller can send out commands to the same valve controller and other valve controllers (where present) to mitigate valve degradation effects. For example, where valve degradation has occurred, the engine controller can command the valve controller to deactivate the one or more valves in the cylinder where the valve controller recognized valve degradation. Further, the engine controller can command the deactivation of other cylinders, by closing valves and stopping fuel flow and/or spark, so that the engine continues to fire in an even firing order. Further still, the engine controller can command changes in the valve timing of cylinders that remain active so that the torque reduction caused by cylinder deactivation is reduced or eliminated.

In step 508, the engine controller can take actions to deactivate one or more cylinders. When valve degradation is determined for a particular cylinder, the engine controller deactivates a particular cylinder by inhibiting fuel flow and/or spark to the cylinder. If it is desired to maintain the engine in an even firing mode, the engine controller also deactivates one or more additional cylinders by inhibiting fuel flow and/or spark to those cylinders. Cylinders to be deactivated are selected by the cylinder number having valve degradation and by the engine firing order. For example, for a four-cylinder engine that has a firing order of 1-3-4-2, and where cylinder number one is experiencing valve degradation, the engine controller can deactivate cylinders numbered one and four. Cylinders three and two remain active. However, note that in cases where the number of engine cylinders is low (e.g., four or less) the engine controller can choose to simply deactivate the cylinder that may be experiencing valve degradation. This allows the engine to retain a higher torque capacity at a higher level of engine vibration. Thus, an engine controller can be configured to deactivate additional cylinders where valve degradation is determined, and/or it can be configured to simply deactivate a cylinder experiencing valve degradation. In one example, the total number of cylinders, the desired torque demand, and the expected level of engine vibration can be used to determine the specific cylinders that are deactivated. When engine torque demand is low, the number of cylinders can be reduced to produce an even firing engine. Conversely, where the desired engine torque request is higher, the number of activated cylinders can be increased. In this way, the number of active cylinders can be varied as the engine torque demand varies so that engine vibration is reduced, while a higher level engine torque capacity is maintained. The routine proceeds to step 510.

In step 510, the routine can adjust the torque output of active cylinders to compensate for torque lost by deactivating cylinders. For example, where a control system configuration permits an engine controller to communicate to individual valve controllers, an engine controller can detect valve degradation for a cylinder having degraded communications between the cylinder valve controller and the engine controller. The engine controller can then deactivated selected cylinders to account for the valve degradation. Knowing the cylinder numbers of deactivated cylinders, the engine controller can adjust the valve timing of active cylinders to achieve the desired engine torque, at least up to the active cylinder torque capacity. Specifically, the routine divides the desired torque among the active cylinders and determines the amount of torque each cylinder needs to produce to match the desired torque. The desired torque can be converted into a fuel amount that will produce the desired torque amount when the fuel is combusted with air. Then, a cylinder air amount can be determined from the previously mentioned fuel amount and the desired air-fuel ratio. The engine controller commands the valve controllers to timings such that each active cylinder produces a fraction of the desired engine torque. The method described in U.S. Pat. No. 7,072,758 is one example that shows how to determine cylinder air charge and is hereby fully incorporated into this description by reference for all purposes and intents.

In an alternative embodiment, the engine controller can compensate for deactivated cylinder torque loss by adjusting the throttle position of a throttle located up stream of variably actuated valves, see FIG. 1 label 125 for example. The throttle plate position can be adjusted to change the intake manifold pressure so that the air flowing into active cylinders increases. In one example, the amount of air flow needed to produce a desired engine torque at a given engine speed can be looked up in empirically determined tables or functions that are indexed by engine speed and a desired torque amount. The engine flow rate can be converted to a cylinder air charge. And the cylinder air charge can be used to determine the desired intake manifold pressure using the well known ideal gas law PV=nRT. The throttle plate can be adjusted to achieve the desired intake manifold pressure using a PI controller and manifold pressure feedback. Alternatively, a throttle position sensor and a throttle model could also be incorporated to achieve the desired intake manifold pressure. If throttle position is used to adjust the torque produced by active cylinders, it is not necessary for the engine controller to communicate instructions to a valve controller. In yet another embodiment, the engine controller can issued both valve commands and throttle commands so that cylinder air charge is adjusted by two up stream throttling devices. In this way, the throttle and valve timing of active cylinders is adjusted to compensate for torque lost when a cylinder is deactivated.

In another embodiment, the engine controller may be configured to simply deactivate one or more cylinders without compensating the cylinder air charge of active cylinders. In this embodiment, step 510 may be skipped. The routine proceeds to exit.

As will be appreciated by one of ordinary skill in the art, the routine described in FIG. 5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for controlling valves of a variable valve event valvetrain, the method comprising:
    controlling at least a valve of a variable valve event valvetrain in at least a cylinder of an engine using a valve controller; and
    using an engine controller to deactivate said at least a cylinder when a communications link between said valve controller and said engine controller is at least partially degraded.

2. The method of claim 1 wherein said engine controller deactivates said at least a cylinder in response to operating conditions of said engine.

3. The method of claim 2 wherein said engine controller deactivates said at least a cylinder in response to a change in engine speed.

4. The method of claim 2 wherein said engine controller deactivates said at least a cylinder in response to an intake manifold temperature or pressure.

5. The method of claim 2 wherein said engine controller deactivates said at least a cylinder in response to an exhaust gas constituent.

6. The method of claim 1 wherein said at least a cylinder is deactivated by inhibiting fuel flow or electrical current flow to said at least a cylinder.

7. The method of claim 1 further comprising said engine controller taking actions to compensate for deactivating said at least a cylinder.

8. The method of claim 7 wherein said actions include increasing the torque output of a different cylinder to compensate for the torque reduction that occurs from said deactivation of said at least a cylinder.

9. The method of claim 8 wherein said torque output of said different cylinder is increased by changing the valve timing of said different cylinder.

10. The method of claim 8 wherein said torque output of said different cylinder is increased by changing a position of a throttle plate.

11. A system for controlling an engine having variably controlled cylinder valves, the system comprising:
    an engine having at least one variably controlled valve actuator;
    a communication link between at least two controllers;
    a valve control unit that is one of said at least two controllers and that is connected to said communication link, said valve control unit operating said at least one variably controlled valve actuator when the performance of said communication link is at least partially degraded; and
    an engine control unit that is one of said at least two controllers and that is connected to said communication link, said engine control unit configured to communicate with said valve control unit using said communication link, said engine control unit being capable of deactivating at least a cylinder when said communication link is partially degraded and when engine operating conditions indicate degraded valve operation.

12. The system of claim 11 wherein said engine control unit deactivates said at least a cylinders by inhibiting fuel flow or spark to said at least a cylinders.

13. The system of claim 11 further comprising at least an additional valve control unit that is in communication with said engine controller using said communication link.

14. The system of claim 13 wherein said engine control unit is capable of deactivating cylinders having valves controlled by said at least an additional valve control units.

15. The system of claim 12 wherein said engine control unit adjusts a position of a throttle plate to increase air flowing into active cylinders as said engine control unit deactivates said at least a cylinders.

16. A computer readable storage medium having stored data representing instructions executable by a computer to control an engine having variable valvetrain, the storage medium comprising:
    instructions for operating at least a valve of a variable event valvetrain in at least a cylinder of an engine by using a valve controller when a communications link between said valve controller and an engine controller is at least partially degraded; and
    instructions for using said engine controller to deactivate said at least a cylinder when at least an operating condition of said engine indicates valve degradation, said engine controller adjusting the torque produced by active cylinders to compensate for a torque reduction caused by said engine controller deactivating said at least a cylinder.

17. The computer readable storage medium of claim 16 wherein said instructions are used to adjust an amount of fuel and an amount of air combusted in said active cylinders.

18. The computer readable storage medium of claim 17 wherein said instructions are used to adjust the position of a throttle plate to control said amount of air.

19. The computer readable storage medium of claim 16 wherein said instructions further include instructions to adjust the spark timing of said active cylinders.

20. The computer readable storage medium of claim 16 wherein said instructions further include instructions to determine valve degradation from engine at least an engine sensor.

* * * * *